(12) United States Patent  
Thornton et al.

(10) Patent No.: US 7,007,594 B2
(45) Date of Patent: Mar. 7, 2006

(54) TUMBLER FOR MARINATING FOOD PRODUCT

(76) Inventors: Edward Thornton, 4144 N. River Hills Ct., Janesville, WI (US) 53545; Billy Groves, P.O. Box 1464, Pine Bluff, AR (US) 71613

( * ) Notice: Subject to any disclaimer, the term of this patent is extended or adjusted under 35 U.S.C. 154(b) by 352 days.

(21) Appl. No.: 09/935,520

(22) Filed: Aug. 23, 2001

(65) Prior Publication Data

US 2002/0023549 A1  Feb. 28, 2002

Related U.S. Application Data

(60) Provisional application No. 60/227,213, filed on Aug. 23, 2000.

(51) Int. Cl.  
*A22C 9/00* (2006.01)

(52) U.S. Cl. .............................. 99/472; 99/534; 118/28; 118/30; 118/418

(58) Field of Classification Search .................. 99/467, 99/472, 516, 534–536; 118/13, 19, 50, 417–418, 118/26, 28, 30  
See application file for complete search history.

(56) References Cited

U.S. PATENT DOCUMENTS

| 8,894 A | 6/1835 | Otis |
| 13,635 A | 10/1855 | Bills |
| 99,985 A | 2/1870 | Wegner et al. |
| 205,419 A | 6/1878 | Ring |
| 463,878 A | 11/1891 | Tutt |
| 478,630 A | 7/1892 | Newhall et al. |
| 755,871 A | 3/1904 | Helm |
| 1,121,429 A | 12/1914 | Weinrich |
| 1,507,577 A | 9/1924 | Browne |
| 2,077,088 A | 4/1937 | Anderson ..................... 259/82 |
| 2,323,795 A | 7/1943 | Clarin ......................... 259/72 |
| 2,577,273 A | 12/1951 | Sammis et al. ............... 99/240 |
| 2,956,943 A | 10/1960 | Hoegh ......................... 204/213 |
| 3,032,419 A | 5/1962 | Limpert ....................... 99/102 |
| 3,049,986 A | 8/1962 | Weber ......................... 99/234 |
| 3,081,070 A | 3/1963 | Welsch ........................ 259/89 |
| 3,134,203 A | 5/1964 | Roberts ....................... 51/164 |
| 3,709,193 A | 1/1973 | Moore ......................... 118/19 |
| 3,806,612 A | 4/1974 | Satz et al. |
| 4,029,824 A | 6/1977 | Langen |
| 4,214,518 A | 7/1980 | Petsche |
| 4,458,586 A | 7/1984 | Reed ........................... 99/494 |
| 4,785,727 A | 11/1988 | Miyata et al. ................ 99/535 |
| 5,104,232 A * | 4/1992 | Lennox, III ................. 366/227 |
| 5,543,163 A | 8/1996 | Groves ........................ 426/231 |
| 5,846,587 A | 12/1998 | Kelly et al. ................. 426/289 |

(Continued)

FOREIGN PATENT DOCUMENTS

EP  0053781  6/1982

(Continued)

*Primary Examiner*—Drew Becker  
(74) *Attorney, Agent, or Firm*—Michael Best & Friedrich LLP

(57) ABSTRACT

A vacuum tumbler for marinating food products within a liquid. The vacuum tumbler comprises a container having an interior wall, the interior wall defining a chamber for containing the liquid. A rib extends inwardly from the interior wall at least one-quarter of the distance across the chamber. A drive moves the container so that the rib brings the food products into and out of contact with the liquid, and a vacuum source creates a partial vacuum within the chamber.

28 Claims, 5 Drawing Sheets

U.S. PATENT DOCUMENTS

| | | | |
|---|---|---|---|
| 5,947,015 A * | 9/1999 | Laurbak | 99/535 |
| 6,040,013 A | 3/2000 | Karales | |
| 2003/0085234 A1 * | 5/2003 | Paumen et al. | 220/912 |

FOREIGN PATENT DOCUMENTS

| | | |
|---|---|---|
| EP | 0181024 | 5/1986 |
| JP | 2000069941 A | 3/2000 |

* cited by examiner

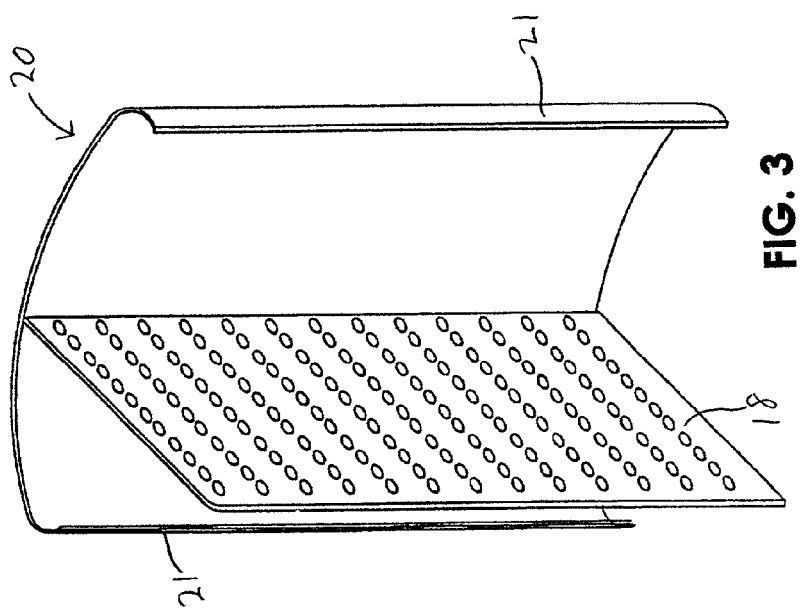
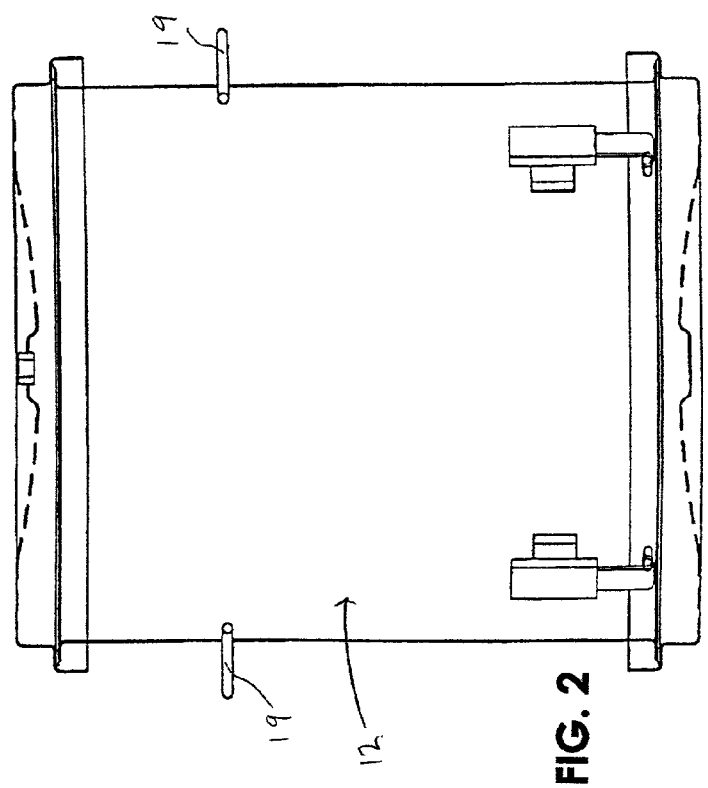

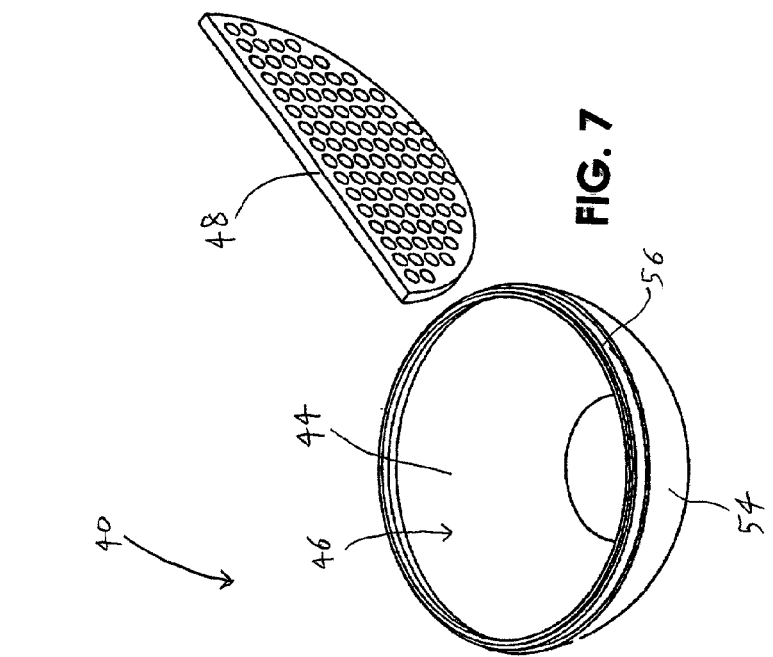
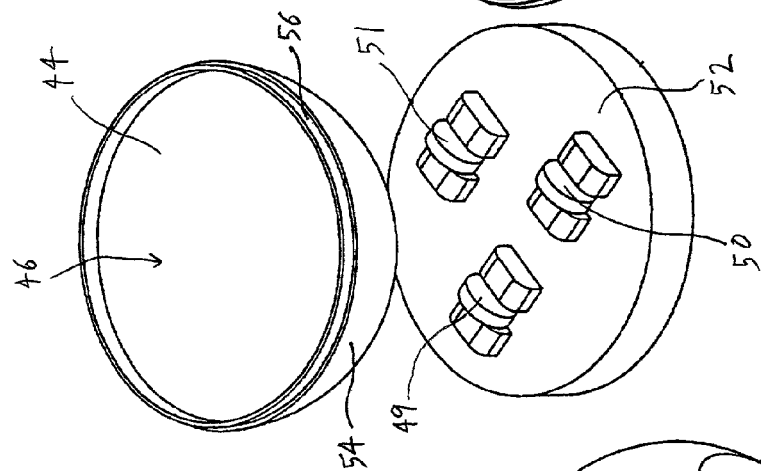
FIG. 7
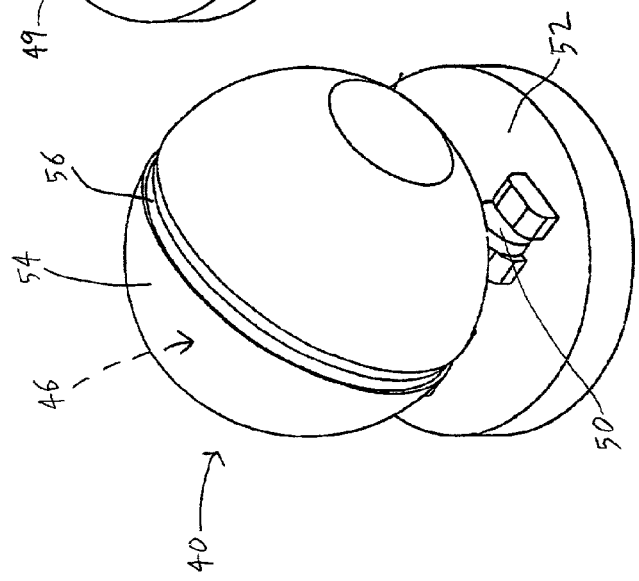
FIG. 6

TUMBLER FOR MARINATING FOOD PRODUCT

RELATED APPLICATIONS

This application claims the benefit of prior filed, co-pending Provisional Patent Application No. 60/227,213, filed Aug. 23, 2000.

FIELD OF THE INVENTION

This invention relates to food processing and more particularly relates to a method and device for marinating food products to impart desirable characteristics to the food products.

BACKGROUND OF THE INVENTION

The food processing industry has continually tried to improve the flavor, nutritional content, look, smell and shelf-life of mass-produced food products. The search by food processors for new methods of enhancing such characteristics of mass-produced food products has resulted in numerous different food processing approaches.

One well known method for enhancing certain characteristics in food products is to marinate the food products within a liquid. Depending on the type of liquid in which the food product is marinated, the characteristics of a particular food product can be drastically changed.

A typical method for marinating food products is disclosed in U.S. Pat. No. 5,543,163, which is incorporated herein by reference. The method disclosed in U.S. Pat. No. 5,543,163 uses a vacuum tumbler to marinate food products. The vacuum tumbler includes a container that is partially filled with a saline solution. A pump that is external to the container creates a partial vacuum within that portion of the container that is not filled with saline solution. The container of the tumbler is maneuvered so that portions of the food products within the container are alternately exposed to the saline solution and the partial vacuum.

The vacuum tumbling process has dramatically improved the ability of food processors to enhance desirable characteristics in mass-produced food products. Therefore, any improvement in the devices or processes relating to marinating food products by vacuum tumbling would be desirable.

SUMMARY OF THE INVENTION

The present invention is directed to a method and device for marinating food products. The method and device of the present invention facilitate marinating food products within a liquid in order to impart certain desirable characteristics to the food products.

The invention relates to a vacuum tumbler for marinating food products. The vacuum tumbler includes a container, a rib, a drive and a vacuum source. The container includes an interior wall that defines a chamber for storing marinating liquid. The rib extends inwardly from the interior wall of the container at least one-quarter of the distance across the chamber. The vacuum source is used to create a partial vacuum within that portion of the chamber that is not occupied by the marinating liquid. The drive manipulates the container (e.g., rotates the container) so that the rib removes the food products from contact with the marinating liquid stored in the chamber into contact with the partial vacuum inside the chamber. The drive continues to maneuver the container until gravity forces the food products to fall from the rib back into the marinating liquid. The drive continuously manipulates the container to alternately expose the food products to the marinating liquid and the partial vacuum within the chamber.

In one form of the vacuum tumbler of the present invention, the vacuum tumbler includes a single perforated rib that it is in the same plane as the axis of rotation of a cylindrical container. The axis of rotation of the container is preferably the longitudinal axis of the cylindrical container with the rib extending across the chamber a distance that is approximately equal to the radius of the chamber. The drive rotates the container about the axis of rotation so that the food products are moved into and out of contact with the marinating liquid by the rib.

It should be noted that the container can be any shape, including cylindrical or spherical, without departing from the scope of the present invention. In addition, the rib can extend entirely across the chamber or be part of an insert secured to the interior wall of the chamber.

In another aspect the invention relates to a method of marinating food products. The method includes the steps of loading the food products into a container; partially filling the container with a marinating liquid; creating a partial vacuum within the container; and maneuvering the food products to alternately expose substantially all of the food products to the marinating liquid and to the partial vacuum.

In one form of the method of the present invention, the food products are maneuvered to alternately expose substantially all of the food products to the marinating liquid and the partial vacuum by inserting the food products into a cylindrical container and rotating the cylindrical container about an axis of rotation that is substantially aligned with the longitudinal axis of the cylindrical container. It should be understood that the axis of rotation could be substantially perpendicular to the longitudinal axis without departing from the scope of the present invention.

In another form of the method the food products are maneuvered to alternately expose substantially all of the food product to the marinating liquid and the partial vacuum by placing the food product on a shelf and moving the shelf up and down, preferably along a vertical axis.

In each form of the invention all of the food products may be removed from the liquid at one time or only a portion of the food products may be exposed to the marinating liquid or the partial vacuum at one time without departing from the scope of the present invention.

In yet another aspect the invention relates to a device for marinating food products within a liquid that includes a fixed container, a shelf, a drive and a vacuum source. An interior wall of the container defines a chamber for holding the marinating liquid. The vacuum source creates a partial vacuum within that portion of the chamber that is not occupied by the liquid. The shelf extends at least partially across the chamber and the drive continuously raises and lowers the shelf into and out of contact with the liquid to alternately expose the food products to the marinating liquid and the partial vacuum within the chamber.

In a preferred form, the container is cylindrical and is situated such that the longitudinal axis of the cylindrical container is vertically oriented. In addition, the shelf is perforated and horizontally oriented such that the shelf can lift the food products into and out of contact with the liquid by moving substantially vertically within the container.

It should be noted that the shelf must merely move up and down (i.e., it is not limited to strictly vertical movement). In addition, the shelf could extend across the entire chamber.

One advantage of the invention is to provide a vacuum tumbler that provides for improved food marinating.

Another advantage of the invention is to provide an improved process for marinating food products that enhances desirable characteristics within food products.

Yet another advantage is to provide a vacuum tumbler that efficiently marinates food products by retrofitting an old tumbler.

Still another advantage of the invention is to provide a device for efficiently marinating food products that is easy to manufacture and assemble.

Other features and advantages of the invention are set forth in the following drawings, detailed description and claims.

BRIEF DESCRIPTION OF THE DRAWINGS

FIG. 2 is a top view illustrating the container of the vacuum tumbler shown in FIG. 1.

FIG. 3 is a perspective view of an insert that is adapted to be placed into the container shown in FIG. 4.

FIG. 6 is a perspective view illustrating another form of an assembled vacuum tumbler of the present invention.

FIG. 7 is an exploded perspective view of the vacuum tumbler shown in FIG. 6.

DETAILED DESCRIPTION

Figure 1:
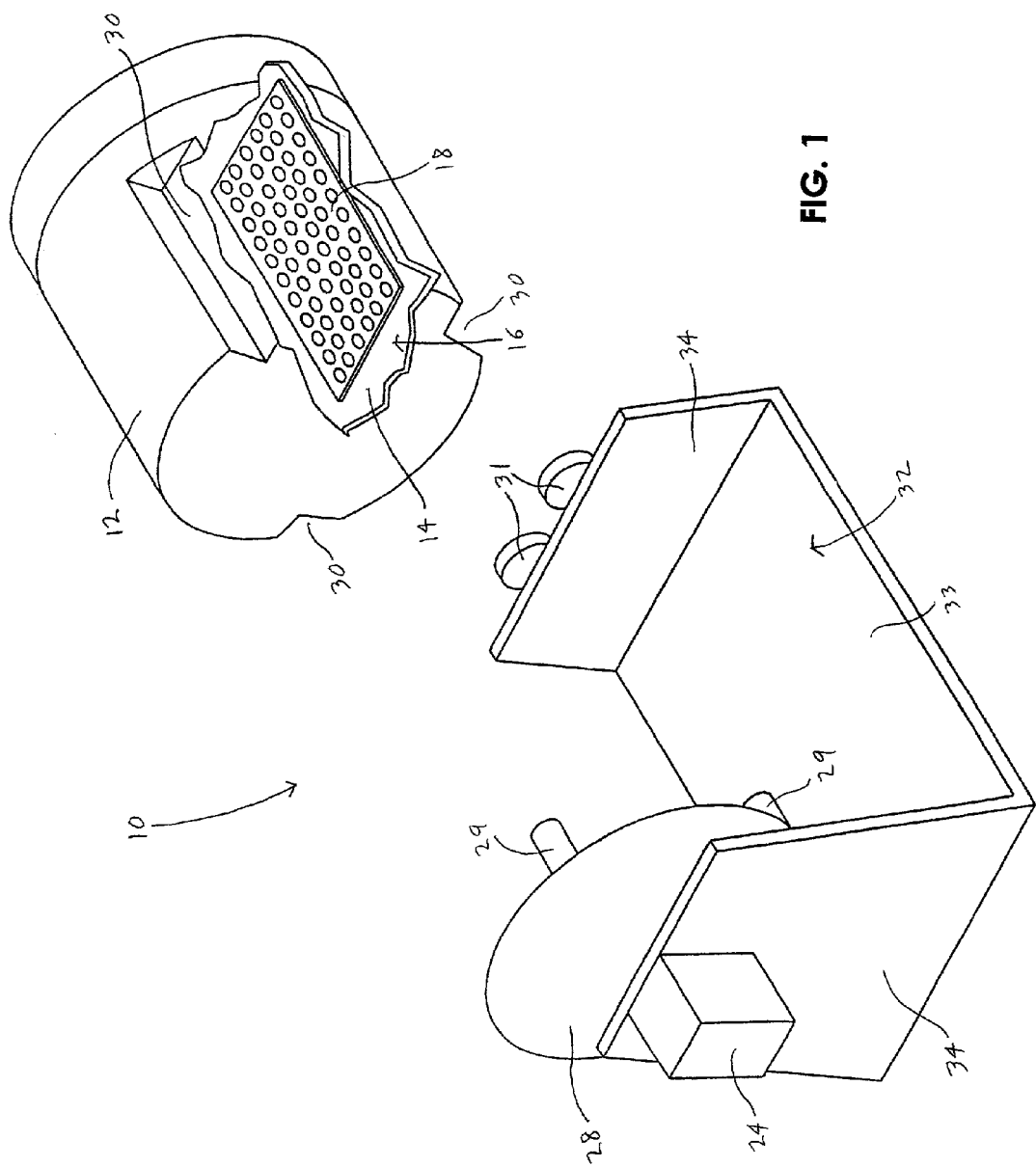
FIG. 1 is a partially exploded and partially sectioned perspective view illustrating a vacuum tumbler of the present invention.

The present invention relates to a method and device for marinating food products as shown and referenced in FIGS. 1–7. A variety of different types of food products (e.g., fish, shrimp, chicken, beef and venison among other animal products) could be used with the process and device of the present invention in order to improve the overall appearance, taste and shelf life of the food products.

The present invention relies on chemical and mechanical manipulation of the food products in order to impart particular characteristics to the food products. Chemically manipulating the food products is done by choosing a marinating liquid that will impart desirable characteristics into the food products when the food products are soaked in the marinating liquid. One or more well-known additives may also be added to the marinating liquid to enhance the marinating process. Mechanically manipulating the food products into and out of the marinating liquid facilitates marinating the food products by repeatedly contacting the food products with the marinating liquid.

One type of marinating liquid that is typically used in conjunction with the present invention is a hypotonic saline solution. A hypotonic saline solution enhances osmosis of the solution into the cellular structure of an animal food product when the food product is marinated in the saline solution. The enhanced osmosis results in improved dilution and extraction of harmful geosmin. An organic acid may be added to the hypotonic saline solution to decompose the geosmin.

A variety of yeast products could also be added to the marinating liquid in order to impart particular flavor characteristics to the food products. The yeast products are typically used both singularly and in combination with other yeast products depending on the desired flavoring that is to be imparted to the food products during the marinating process. It should be understood that any marinating liquid known in the art could be used in the process and device of the present invention without departing from the scope of the present invention.

One form of the vacuum tumbler for marinating food products of the present invention is illustrated in FIGS. 1–4. The vacuum tumbler 10 includes a cylindrical container 12 that is used for storing a marinating liquid. The container 12 includes an interior wall 14 which defines a chamber 16 where the food products and marinating liquid are brought together. The vacuum tumbler 10 also includes a rib 18 that extends at least one-quarter of the distance across the chamber 16 from the interior wall 14 of the container 12. Although the container 12 is shown with only one rib in FIGS. 1–4, a plurality of ribs could be attached to the interior wall 14 of the container 12 without departing from the scope of the present invention. The rib, or ribs, may be attached to the container 12 in any known manner, including but not limited to, the use of conventional fasteners and/or welding. The rib(s) 18 and the container 12 should be made from materials which are suitably strong and meet industry standards for sanitation. The container 12 also includes handles 19 that facilitate handling of the container 12.

Figure 4:
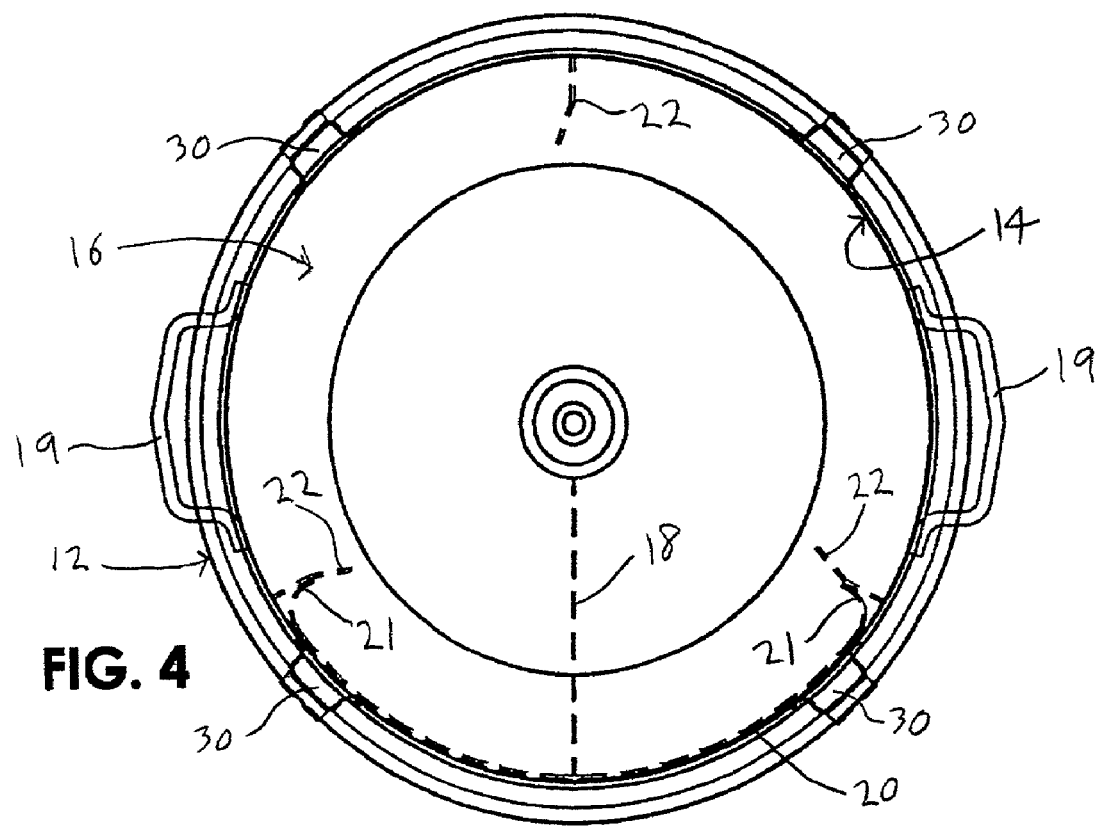
FIG. 4 is a side view of the container shown in FIG. 2.

As shown most clearly in FIGS. 3 and 4, the rib 18 may also be part of an insert 20 that is secured to the interior wall 14 of the container 12. The insert 20 is secured to the container 12 by compressing leg members 21 between projections 22 (shown only in FIG. 4) that extend inwardly from the interior wall 14 of the container 12. It should be understood that the insert 20 could be secured to container 12 in any conventional manner.

The vacuum tumbler 10 also includes a drive 24 (see FIG. 1) that rotates the container 12 such that the rib 18 maneuvers the food products within the container 12 into and out of contact with the marinating liquid. The drive 24 preferably rotates the cylindrical container 12 about its longitudinal axis at a speed between 2 and 16 revolutions per minute, and preferably at 8 revolutions per minute.

During operation of the vacuum tumbler 10, the drive 24 continually rotates a drive plate 28 that includes extensions 29. The extensions 29 fit into corresponding voids 30 on the exterior of the container 12 such that the extensions 29 are able to transmit torque to the container 12. Although the container is shown as including three extensions 29 and three voids 30 in FIG. 1 and four voids 30 in FIG. 4, any number of extensions 29 and voids 30 that facilitates rotation of the container 12 may be used. The container 12 is rotatably supported at the end opposite to the drive plate 28 by rollers 31. Both the drive plate 28 and the rollers 31 are rotatably supported by a frame 32. The frame 32 includes a base 33 and opposing side walls 34 that act as the supports for the drive plate 28 and the rollers 31.

The vacuum tumbler 10 also includes a vacuum source (not shown) that is in airtight fluid communication with the chamber 16 inside the container 12. The vacuum source is used to create a partial vacuum within that portion of the container 12 that is not occupied by the marinating liquid. The vacuum source preferably creates a pressure of at least 25 inches of mercury, and more preferably 28 inches of mercury, within the container 12.

Although the rib 18 is shown as extending straight across the chamber 16 toward the longitudinal axis of the container, it should be noted that the rib may be straight or curved depending on how far the food product should be lifted out of the marinating liquid. The rib 18 is preferably sized so that it is able to lift approximately 25% of the food products within the chamber each time the rib 18 passes through the marinating liquid. The longer the food product is removed from the marinating liquid before it falls back into the marinating liquid due to gravity, the longer the food product will be exposed to the partial vacuum. Therefore, the optimum size, shape and quantity of the ribs will be determined based on the application in which the vacuum tumbler 10 is being used.

The rib 18, or ribs, are also preferably perforated so that the rib(s) puncture the skin of the food product being marinated as the rib(s) periodically engage the food product during rotation of the container 12. Puncturing the food products as they are being marinated typically imparts the food products with the ability to retain a greater percentage of marinating liquid, especially when the food products are exposed to the partial vacuum within the container 12.

Figure 5:
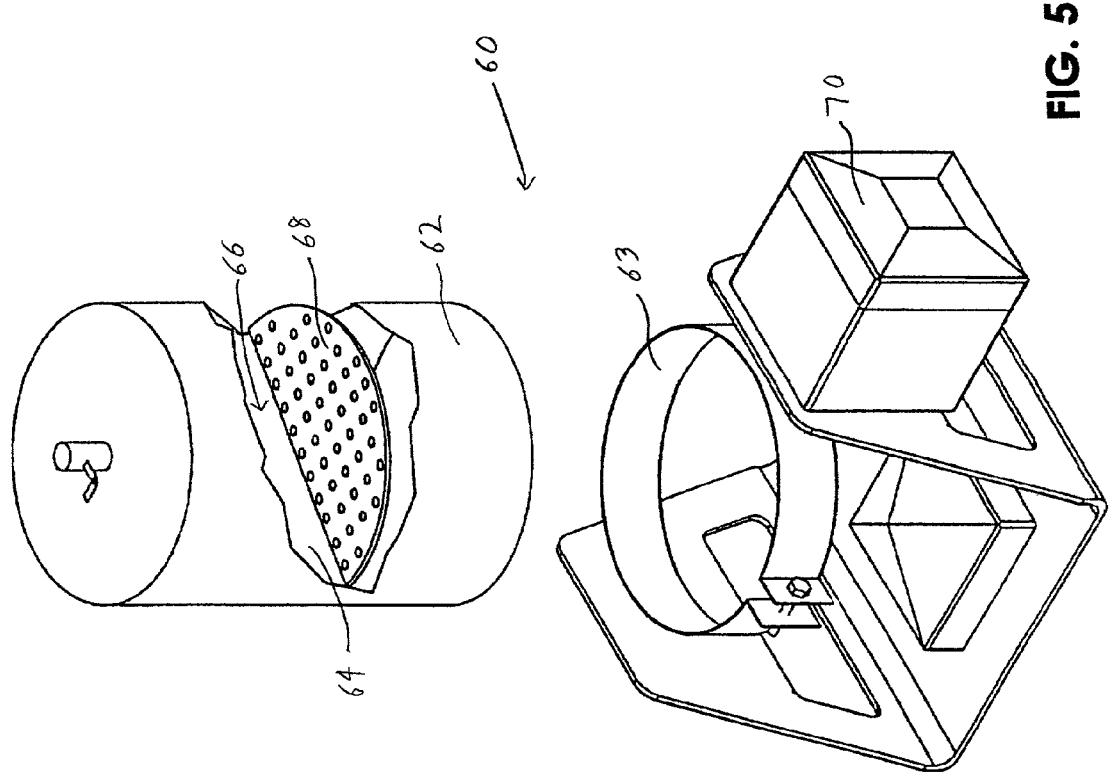
FIG. 5 is a partially exploded and partially sectioned perspective view illustrating another form of the vacuum tumbler of the present invention

Another form of the vacuum tumbler of the present invention is illustrated in FIG. 5. The vacuum tumbler 60 includes a cylindrical container 62 that has an interior wall 64 which defines a chamber 66 for holding a marinating liquid. The tumbler 60 also includes a rib 68 that extends partly, or wholly, across the diameter of the cylindrical container 62 at a location near the middle of the container 62. Similar to other forms of the invention, the number, shape and location of the ribs will depend upon the application in which the tumbler 60 is being used.

The cylindrical container 62 is secured about its circumference by a band 63. The band 63 is rotated by a drive 70 such that the cylindrical container 62 rotates perpendicularly to the longitudinal axis of the cylindrical container 62. As the container 62 rotates, the food products are alternately exposed to the marinating liquid and the partial vacuum with the cylindrical container 62. The drive 70 may rotate the cylindrical container 62 either entirely in one direction or alternately in opposite directions.

In the form of the invention where the cylindrical container 62 is alternately rotated in opposite directions, the shelf 68 preferably extends across most of the diameter of the cylindrical container 62. The food products may be placed on one, or both, sides of the shelf 68 such that as the cylindrical container 62 rotates back and forth in opposite directions (e.g. through 180° of rotation) the marinating fluid falls from one side of the cylindrical container 62 through the perforated shelf 68 to the other side of the cylindrical container 62. As the container 62 reciprocates back and forth, the food products on one/both sides of the shelf 68 are alternately exposed to the marinating liquid and the partial vacuum within the cylindrical container 62.

In yet another form of the invention, the cylindrical container 62 is fixed so that the longitudinal axis of the cylindrical container 62 is substantially vertical. In this form the food product are placed onto the shelf 68 and the shelf 68 is maneuvered up and down within the fixed cylindrical container 62 in order to alternately expose the food products to the marinating liquid and the partial vacuum. Although only one shelf is shown in FIG. 5, a number of shelves may be used to circulate the food products up and down within the container. In a preferred form the shelf 68 extends across most of the diameter of the cylindrical container 62 and the shelf 68 is moved vertically within the cylindrical container 62.

Another form of the vacuum tumbler is shown in FIGS. 6 and 7. In this form, the vacuum tumbler 40 includes a spherical container 42 having an interior wall 44 that defines a spherical chamber 46 which holds the marinating liquid. The vacuum tumbler 40 also includes a perforated rib 48 that is secured to the interior wall 44 of the spherical container 42 and extends into the spherical chamber 46. Although the rib 48 is shown as being semi-circular within the spherical container 42, any form of the rib 48 could be used without departing from the scope of the present invention.

During operation of the vacuum tumbler 42, a drive (not shown) rotates the spherical container 42 so that the rib 48 brings food products into and out of contact with the marinating liquid and the partial vacuum within the spherical chamber 46. The spherical container 42 is supported by rollers 49, 50, 51 that are rotatably mounted on a base pedestal 52. The outside surface 54 of the spherical container 42 includes a channel 56 that extends around the circumference of the spherical container 42. The roller 51 fits within the channel 56 so that as the spherical container 42 rotates, the roller 51 and channel 56 maintain alignment of the spherical container 42. In an alternative form, the drive rotates the roller 51 such that the roller 51 rotates the spherical container 42.

As with all forms of the invention the number of ribs, size of the container, amount of marinating liquid and amount of food product placed within the spherical container depend upon the application (i.e., the type and size of the food products being marinated and the marinating liquid) in which the vacuum tumbler 42 is being used.

The method of the present invention will now be outlined in detail. The steps performed in the process of the present invention are shown in a particular order but may be performed in a different sequence without departing from the scope of the present invention. In addition, the steps in the process may be performed at a single location or multiple locations.

The method of the present invention includes the steps of: loading the food products into a container; partially filling the container with a marinating liquid; creating a partial vacuum within the container; and maneuvering the food products to alternately expose substantially all of the food products to the marinating liquid and to the partial vacuum.

During the process of creating a partial vacuum within the container, the partial vacuum is generated within the container by an external pump. The preferred pressure for most applications in that portion of the container that is not occupied by the marinating liquid is preferably at least 25 inches of mercury, and more preferably is 28 inches of mercury. The appropriate pressure within the partial vacuum in the container will depend on such factors as the size of the container, the amount of marinating liquid and the type and size of the food products being marinated.

The food products within the container are maneuvered to alternately expose substantially all of the food products to the marinating liquid and the partial vacuum by rotating the container. Although other rotation rates could be utilized without departing from the scope of the invention, the container typically rotates from 2 to 16 revolutions per minute with the preferred speed being 8 revolutions per minute. It is important that all of the food products are alternately exposed to the marinating liquid and to the partial vacuum, but all of the food products do not necessarily have to be exposed to either the marinating liquid or partial vacuum at one time.

The equipment (e.g., a vacuum tumbler) that is used to perform the method of the present invention will have a rated capacity based upon the type of equipment that is used to perform the method. The equipment is typically rated according to a weight capacity. Although other percentages may be used without departing from the scope of the present invention, the weight of the solution should preferably not exceed 35% of the rated weight capacity of the equipment and the weight of the food should comprise the remaining 65% of the rated weight capacity.

In one form of the method of the present invention, the equipment includes cylindrical container that has a longitudinal axis which is substantially aligned with the axis of rotation of the container. The longitudinal axis of the cylindrical container could also be substantially perpendicular to the axis of rotation of the container without departing from the scope of the present invention.

In another form of the method, the food products are moved up and down within a fixed container to alternately expose the food products to the marinating liquid and the partial vacuum within the chamber. Although the food products are preferably moved up and down using a shelf that moves along a vertical axis, the food products can be moved up and down in any pattern that alternately exposes them to the marinating liquid and the partial vacuum.

The appropriate relative amounts of time that the food products should spend within the marinating liquid and the partial vacuum will depend upon on a variety of factors. One factor is the type of vacuum tumbler that is used to marinate the food product. Another factor is the type and size of the food product being marinated. Yet another factor is the type of marinating liquid that is being used to marinate the food products. Each of these factors also has an affect on the appropriate amounts of food products and marinating liquid that are placed within the container before the food products are alternately exposed to the marinating liquid and the partial vacuum.

In some applications the food products will need to be exposed to the partial vacuum for a greater period of time because the longer the food products are exposed to the partial vacuum the greater the food products expand. This increased expansion of the food products provides the food products with a greater ability to absorb a larger amount of marinating liquid before the food products subsequently reenter the marinating liquid.

The foregoing description of the present invention has been presented for purposes of illustration and description. The description is not intended to limit the invention to the form disclosed herein. Consequently, variations and modifications commensurate with the above teachings and the skill or knowledge of the prior art, are within the scope of the present invention. The embodiments described herein are intended to explain the best modes for practicing the invention and to enable others skilled in the art to utilize the invention in the disclosed or other embodiments and with various modifications required by the particular applications or uses of the present invention. It is intended that the appended claims be construed to include alternative embodiments to the extent permitted by the prior art. Various features and advantages of the present invention are set forth in the following claims.

What is claimed is:

1. A vacuum tumbler for marinating food products within a liquid, the vacuum tumbler comprising:
    a container having an interior wall, said interior wall defining a chamber for containing the liquid, the chamber defining a longitudinal axis extending therethrough and having a length measured along the longitudinal axis;
    a rib extending inwardly from said interior wall generally toward the longitudinal axis at least one-quarter of the distance across said chamber along substantially the entire length of the chamber;
    a drive for moving the container so that the rib brings the food products into and out of contact with the liquid; and
    a vacuum source for creating a partial vacuum within said chamber.

2. The tumbler of claim 1 wherein said drive rotates said container about an axis of rotation and said rib extends toward said axis of rotation.

3. The tumbler of claim 2 wherein said rib is in a plane with the axis of rotation.

4. The tumbler of claim 1 wherein the tumbler includes only a single rib.

5. The tumbler of claim 1 wherein said rib is perforated.

6. The tumbler of claim 1 wherein said chamber is cylindrical.

7. The tumbler of claim 6 wherein said drive rotates said container about said longitudinal axis.

8. The tumbler of claim 7 wherein said rib is in a plane with said longitudinal axis and said rib extends at least one-half of the radius of said chamber across said chamber.

9. The tumbler of claim 8 wherein said rib extends a distance across said chamber approximately equal to the radius of said chamber.

10. The tumbler of claim 1 wherein said rib is part of an insert secured to said interior wall.

11. The tumbler of claim 10 wherein said insert includes a mounting section having an inner surface, an outer surface, said outer surface being shaped to mate with a portion of said interior wall within said container and said rib extending from said inner surface into said chamber, said mounting section also including opposing edges with extensions projecting from said opposing edges into said chamber, said container including projections extending inward from said interior wall into said chamber such that said extensions on said mounting section are compressed between said projections.

12. The tumbler of claim 1 wherein the rib is substantially planar.

13. A device for marinating food products within a liquid, the device comprising:
    a container having an interior wall defining a chamber for containing the liquid, the chamber including a first end and second end and having a length measured therebetween;
    a rib extending, along at least one-half of the length of the chamber, away from the interior wall and through the chamber across at least a quarter of the distance across said chamber in the direction the rib extends away from the interior wall;
    a drive for maneuvering said rib to bring the food products into and out of contact with the liquid; and
    a vacuum source for creating a partial vacuum within said chamber.

14. The device of claim 13 wherein said rib is perforated.

15. The device of claim 14 wherein said rib extends across said entire chamber.

16. The device of claim 13 wherein the rib is connected to the interior wall.

17. The device of claim 13 wherein the drive rotates the container about an axis of rotation and the rib extends generally toward the axis of rotation.

18. The device of claim 17 wherein the rib is in a plane with the axis of rotation.

19. The device of claim 13 wherein the device includes only a single rib.

20. The device of claim 13 wherein the rib is perforated.

21. The device of claim 13 wherein the chamber is cylindrical.

22. The device of claim 21 wherein the chamber includes a longitudinal axis, the drive rotating the container about the longitudinal axis.

23. The device of claim 22 wherein the rib is in a plane with the longitudinal axis and the rib extends at least one-half of the radius of the chamber across the chamber.

24. The device of claim 23 wherein the rib extends a distance across the chamber approximately equal to the radius of the chamber.

25. The device of claim 22 wherein the rib extends substantially the entire length of the chamber.

26. The device of claim 13 wherein the rib is part of an insert secured to the interior wall.

27. The device of claim 26 wherein the insert includes a mounting section having an inner surface, an outer surface, the outer surface being shaped to mate with a portion of the interior wall within the container and the rib extending from the inner surface into the chamber, the mounting section also including opposing edges with extensions projecting from the opposing edges into the chamber, the container including projections extending inward from the interior wall into the chamber such that the extensions on the mounting section are compressed between the projections.

28. The device of claim 13 wherein the rib is substantially planar.

* * * * *